US012801910B2

(12) United States Patent
Singh et al.

(10) Patent No.: US 12,801,910 B2
(45) Date of Patent: Nov. 17, 2026

(54) AUTOMATIC FLOW GENERATION FROM CUSTOMER TICKETS USING DEEP NEURAL NETWORKS

(71) Applicant: SAP SE, Walldorf (DE)

(72) Inventors: Mithilesh Kumar Singh, Ara (IN); Mohammad Saad Rashid, Delhi (IN); Warren Mark Fernandes, Mumbai (IN)

(73) Assignee: SAP SE, Walldorf (DE)

( * ) Notice: Subject to any disclaimer, the term of this patent is extended or adjusted under 35 U.S.C. 154(b) by 1069 days.

(21) Appl. No.: 16/987,811

(22) Filed: Aug. 7, 2020

(65) Prior Publication Data

US 2022/0044111 A1 Feb. 10, 2022

(51) Int. Cl.

| | |
|---|---|
| ***G06N 3/08*** | (2023.01) |
| ***G06F 16/903*** | (2019.01) |
| ***G06F 16/9032*** | (2019.01) |
| ***G06F 18/214*** | (2023.01) |
| ***G06F 18/22*** | (2023.01) |
| ***G06F 40/30*** | (2020.01) |
| ***G06K 9/62*** | (2022.01) |
| ***G06Q 30/01*** | (2023.01) |
| ***G06Q 30/016*** | (2023.01) |

(52) U.S. Cl.

CPC ......... *G06N 3/08* (2013.01); *G06F 16/90332* (2019.01); *G06F 16/90335* (2019.01); *G06F 18/214* (2023.01); *G06F 18/22* (2023.01); *G06F 40/30* (2020.01); *G06Q 30/01* (2013.01); *G06Q 30/016* (2013.01)

(58) Field of Classification Search

CPC .......... G06N 3/08; G06N 3/045; G06N 3/044; G06F 16/90335; G06F 16/90332; G06F 40/30; G06F 18/22; G06F 18/214; G06Q 30/016; G06Q 30/015; G06Q 30/01

See application file for complete search history.

(56) References Cited

U.S. PATENT DOCUMENTS

| | | | | |
|---|---|---|---|---|
| 7,185,016 | B1 * | 2/2007 | Rasmussen | G06Q 10/10 |
| 10,733,507 | B2 * | 8/2020 | Kataria | G06N 3/042 |
| 11,429,834 | B1 * | 8/2022 | Xue | G06F 40/284 |
| 2009/0063470 | A1 * | 3/2009 | Peled | G06F 40/295 707/999.005 |
| 2012/0166434 | A1 * | 6/2012 | Lee | G06F 16/3338 707/E17.014 |
| 2013/0191185 | A1 * | 7/2013 | Galvin | G06Q 30/01 705/7.36 |
| 2014/0215574 | A1 * | 7/2014 | Erb | H04L 63/10 726/4 |

(Continued)

*Primary Examiner* — Stephen S Hong
*Assistant Examiner* — Carl E Barnes, Jr.
(74) *Attorney, Agent, or Firm* — SCHWEGMAN LUNDBERG & WOESSNER, P.A.

(57) ABSTRACT

In an example embodiment, actionable flows are found from customer tickets by autonomously reading and understanding customer queries using neural networks. Specifically, in an example embodiment, a deep neural network is trained to be utilized at two separate stages in a flow generation process. In one stage, the neural network is used to identify a list of repetitive queries from a repository of customer tickets. In another stage, the neural network is used to identify actionable flows from query steps obtained from the list of repetitive queries.

20 Claims, 6 Drawing Sheets

(56) References Cited

U.S. PATENT DOCUMENTS

| | | | | |
|---|---|---|---|---|
| 2014/0325254 | A1* | 10/2014 | Mani | G06F 16/285 707/738 |
| 2015/0254263 | A1* | 9/2015 | Dong | G06F 16/248 707/742 |
| 2019/0251165 | A1* | 8/2019 | Bachrach | G06N 3/084 |
| 2021/0026858 | A1* | 1/2021 | Jauhari | G06F 16/24578 |
| 2021/0264253 | A1* | 8/2021 | Damodaran | G06N 3/044 |

* cited by examiner

AUTOMATIC FLOW GENERATION FROM CUSTOMER TICKETS USING DEEP NEURAL NETWORKS

TECHNICAL FIELD

This document generally relates to machine learning. More specifically, this document relates to automatic flow generation from customer tickets using deep neural networks.

BACKGROUND

Customer support is utilized by many industries to provide technical and other assistance to customers having trouble with products or services provided by an organization. Customers generally will request help via telephone, email, or in-application assistance channels. These requests are generally called "tickets". It can be difficult for organizations to scale customer support, however, as there is often a dependency on a human support agent that can only handle limited tickets per day, and it can be difficult to employ and train enough human support agents to support a rapidly growing customer base. Furthermore, about half of all tickets are repetitive and require repeat attention.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Despite recent progress in automation of handling of customer support tickets, organizations still find it difficult to scale their support offerings, which leads to poor customer satisfaction and increasing customer chums. Fully automated conversational chatbots can be used to handle basic customer queries, but these conversational chatbots, despite using machine learning, still are only able to handle simple problems worded in specific ways. Semi-automated support can also be used by support agents, which use software to assist them in finding answers to questions faster, but such solutions also suffer from the fact that the human agent still needs to identify the questions or problems being asked in a request.

In an example embodiment, actionable flows are found from customer tickets to handle customer queries by autonomously reading and understanding customer queries using neural networks. A flow in this context is a specific identification of a solution or a portion of a solution to a customer request. An actionable flow would therefore be a specific identification of something the agent could do to address the customer's problem. Often, but not always, there may be multiple flows needed to address the customer's issue. For example, a customer may be trying to get a copy of an invoice and then also find out a status of the order corresponding to the invoice, and thus the actionable flows in this example would be to obtain the order status and to obtain a copy of the invoice.

Specifically, in an example embodiment, a deep neural network is trained to be utilized at two separate stages in a flow generation process. In one stage, the neural network is used to identify a list of repetitive queries from a repository of customer tickets. In another stage, the neural network is used to identify actionable flows from query steps obtained from the list of repetitive queries.

Figure 1:
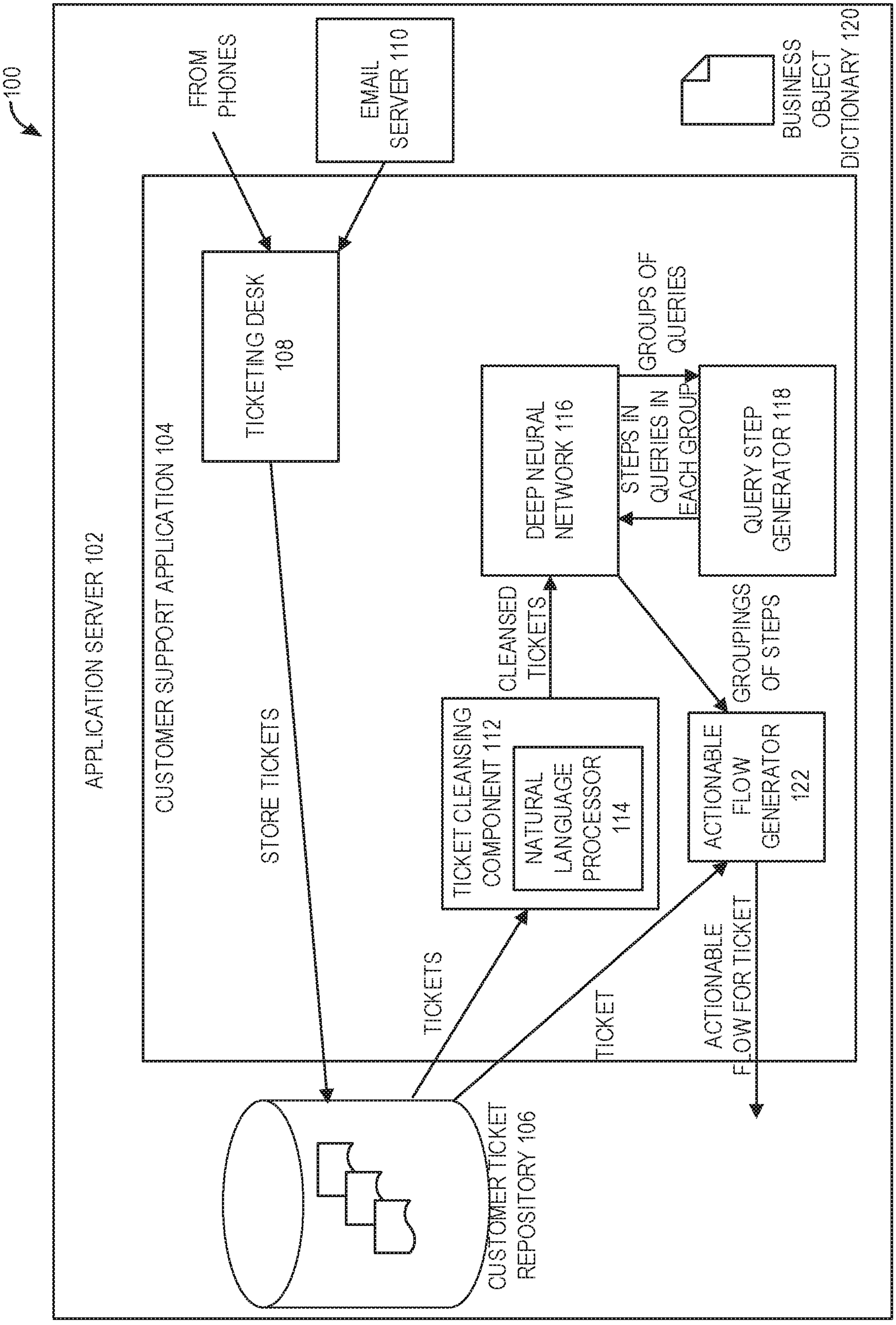
FIG. 1 is a block diagram illustrating a system for generating flows from customer support tickets in an example embodiment.

FIG. 1 is a block diagram illustrating a system 100 for generating flows from customer support tickets in an example embodiment. Here, an application server 102 runs a customer support application 104 that generates the flows. The flows may be utilized in a number of different ways. Firstly, the flows may be used to help support agents, who may use the flows to more quickly identify what a customer needs to address the corresponding ticket. A support agent may then go ahead and perform the actions needed to address the ticket, such as retrieving an order status and a copy of an invoice and sending both to the user. Secondly, flows may be used to enable self-service. Some flows may be automated to retrieve information needed by the customer without the need for a human support agent. Thirdly, the flows themselves may be used to improve the deep neural network, which will be described in more detail later, to better identify similar customer queries.

A customer ticket repository 106 may contain tickets from customers. These tickets may be collected by integrating the customer ticket repository 106 to other pieces of software where the tickets may be received, such as a ticketing desk 108 and an email server 110. In an example embodiment, the customer ticket repository 106 contains only tickets that have yet to be addressed (i.e., once the ticket is closed, it is removed from the customer ticket repository 106) and are still active (i.e., not outdated).

A ticket cleansing component 112 then performs various actions on each of a plurality of customer tickets from the customer ticket repository 106. These actions act to convert the tickets to a standardized format. These actions may generally be divided into two categories: query language normalization and general filtering. In query language normalization, the customer ticket is modified so that it only includes a specified language or languages. The selection of which language or languages count as "specified" may be based on the word corpus that an administrator wishes to train the deep neural network to recognize. Generally speaking, this may be the most likely language(s) that will be contained in a customer ticket, although there is no requirement that the language(s) be so limited. For example, it may be determined that English and Chinese are specified languages, and thus any queries contained in the tickets that are in languages other than English and Chinese (such as French) are normalized. In a simple case, normalization may involve removing the text that is not in the specified language(s) from the ticket. In a more complex case, machine translation techniques may be used to covert the text that is not in the specified language(s) to a specified language. It should be noted that it is possible that a single ticket contains queries in more than one language. For example, a single ticket may have a first query in French, a second query in English, and a third query in Chinese. In such cases, only the text in the non-specified language(s) is modified (either by deletion or conversion), while the portions of the ticket in the specified language(s) remain the same.

In an example embodiment, query language may be detected using a natural language processor 114. It should be noted that this natural language processor 114 may utilize machine learned models to detect the query language, but these machine learned models may be different than the deep neural network described later, despite both of them potentially using similar natural language processing techniques to accomplish their different goals.

The general filtering actions may include removing unwanted words and characters from the queries. This may include removing unnecessary spaces, removing standard punctuations such as !"#$%&'( )*+,–/:;<=>?@[\]^_'{|}~, keeping only characters containing the letters a-z and the numbers 0-9, normalizing case (such as by converting everything to lowercase), removing stop words such as ‘i’, ‘me’, ‘my’, ‘myself’, ‘we’, ‘our’, ‘ours’, ‘ourselves’, ‘you’, ‘your’, ‘yours’, ‘yourself’, ‘yourselves’, ‘he’, ‘him’, ‘his’, etc., removing greeting words such as “hi, hello, regards, kind, regards, etc.”, and the replacing of some words with regular expressions. Additionally, stemming and lemmatization of words may be performed using the natural language processor 114. Stemming and Lemmatization are text normalization techniques. Stemming is the process of reducing inflection in words to their root forms, such as mapping a group of words to the same stem even if the stem itself is not a valid word in the language. Thus, stemming a word involves removing prefixes and suffixes. Lemmatization, on the other hand, reduces the inflected words to a root form that is part of the language. This root word is called a lemma. Lemmatization involves identifying a canonical version of a word, and the canonical version may involve more or less than merely removing suffixes and prefixes. For example, ran, run, and running may be lemmatized to the canonical word “run”, even though changing ran to run does not involve adding or removing suffixes.

Once the ticket cleansing component 112 has finished cleansing each ticket, the ticket may be feed to a deep neural network 116 that acts to understand the customer queries and generate similarity scores among customer queries based on the plurality of tickets fed to it. Specifically, the deep neural network 116 uses a predetermined threshold value to group semantically similar queries (within each ticket but more importantly across pluralities of tickets). The result is a set of groups, with each group being a set of semantically similar queries from the plurality of (cleansed) tickets. Each group of queries contains queries that have similarity scores among each other that exceed the predetermined threshold value.

In an example embodiment, the top n groups may then be picked based on the number of queries within each group. The value of n may be set by an administrator. For example, if n is 10, then the top 10 groups, based on the number of queries in each group, are selected.

A query step generator 118 then takes the queries in each of the top n groups (if that value is used), identifies any business objects and their synonyms in the queries, and then divides the queries into steps, with one step for each business object. Each step is a sub-part of a query that has one identified business object on or about which an action can be performed.

Specifically, a business object dictionary 120 stores all business objects available to be acted upon or about in the system 100. This may include, for example, all types of data to which a customer may have access in an organization. Each organization may have its own unique business object dictionary. Examples of business objects may include, for example, purchase orders, supplier invoices, order statuses. The business object dictionary 120 may store all of the names of these business objects, along with any synonyms for each of them. For example, a business object dictionary 120 may look like the following:

```
businessObject = {
 "purchase order": ["po", "pos", "purchases order", "purchase orders",
 "pur*ord*"],
 "supplier invoice": ["invoice", "invoices", "supplier invoices", "sup*
 inv*"],
 .
 .
 .
}
```

Specifically, for each query, all the business objects inside the query are identified by using the business object dictionary 120. If the query only includes a single business object, then the query may just be output as is. If the query includes multiple business objects, however, then for every pair of business objects in the query, it is determined if the business objects in the pair are joined by a predefined conjunction. Examples of conjunctions include “either . . . or,” “along . . . with,” “just . . . as,” “for,” “and,” “but,” “nor,” “besides” and “likewise.”

Each of the query steps for a group of queries may then be passed back into the deep neural network 116, which then identifies groups of semantically similar query steps within that query group. Each group of query steps contains query steps that have similarity scores among each other that exceed the predetermined threshold value. Each of the groups of query steps then represents a different actionable flow for the query group. The same process can be repeated for each query group. An actionable flow generator 122 then uses the groups of query steps to generate, for a given ticket, one or more actionable flows based on the different groups of query steps identified in the given ticket.

Figure 2:
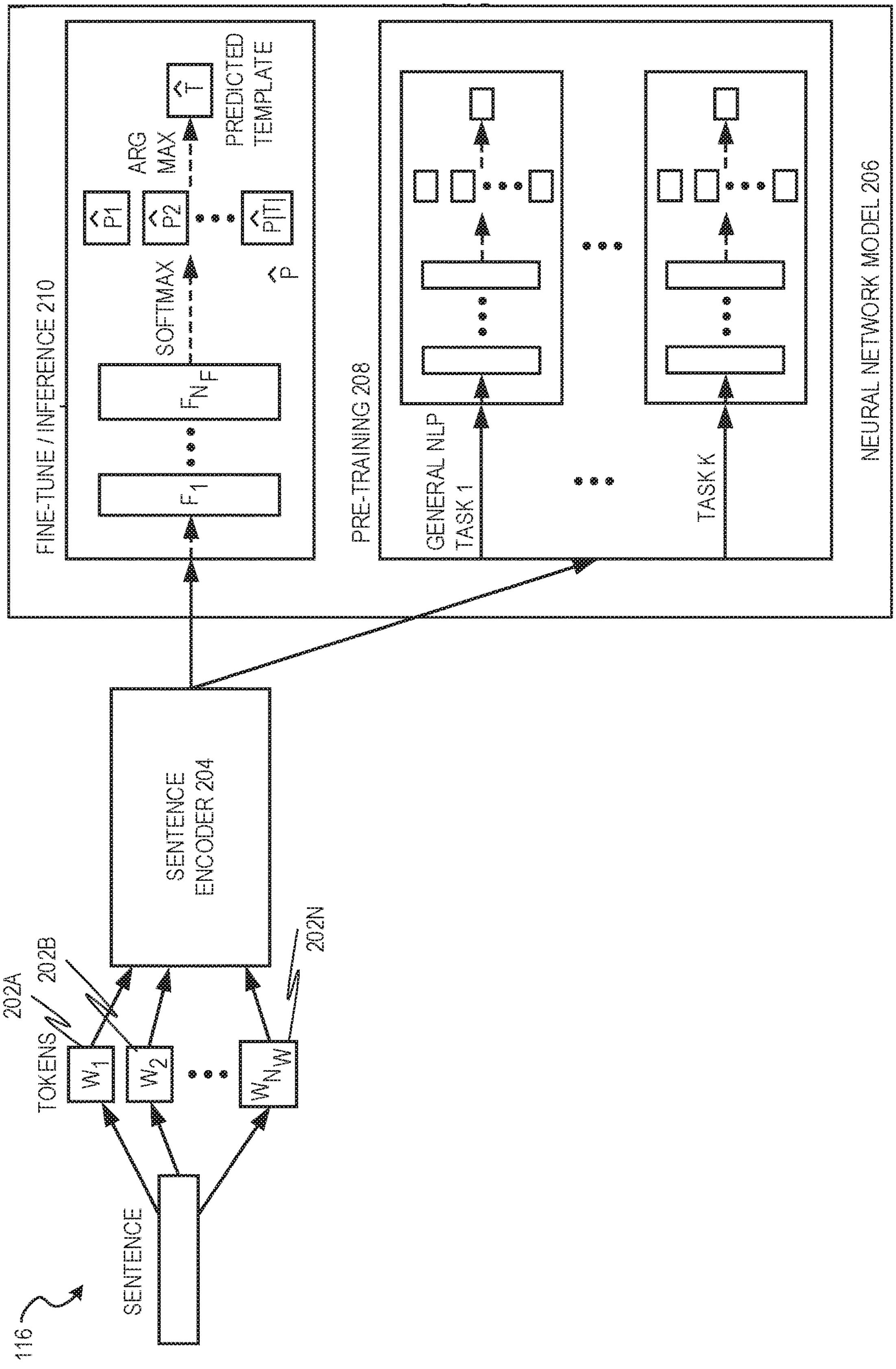
FIG. 2 is a block diagram illustrating the deep neural network in more detail in accordance with an example embodiment.

In one example embodiment, the deep neural network 116 implements a neural network having a sentence encoder, with the neural network programmed with a loss function. FIG. 2 is a block diagram illustrating the deep neural network 116 in more detail in accordance with an example embodiment. Each sentence is split into a series of tokens 202A-202N and the tokens 202A-202N are passed to a sentence encoder 204, which utilizes a neural network model 206. In an example embodiment, the sentence encoder 204 is first pre-trained 208 with general tasks, and then the sentence encoder 204 is fine-tuned 210 with a multilayer perceptron network (MLP) using the template classification data.

The MLP learns how to parse a sentence and assign an embedding to the sentence based on the parsing. The embedding identifies a set of coordinates (called a vector) in a multidimensional space to each parsed sentence. One or more similarity measures between coordinates may then be used to identify the similarity between corresponding sentences. One example metric is cosine similarity. In cosine similarity, the cosine of the angle between two vectors is computed. The cosine similarity of two sentences will range from 0 to 1. If the cosine similarity is 1, it means the two vectors have the same orientation and thus are identical. Values closer to 0 indicate less similarity. Other measures of similarity may be used, in lieu of or in addition to the cosine similarity, such as Euclidean distance and Jaccard similarity. Additionally, these baseline metrics can be improved by methods such as ignoring stopwords and computing averages weighted by term frequency—inverse document frequency (TF-IDF). Alternatively, techniques such as Word Mover's Distance (WMD) and Smooth Inverse Frequency (SIF) can also be employed.

In an example embodiment, the deep neural network is a Long Short Term Memory (LSTM) network. An LSTM network is a special type of Recurrent Neural Network (RNN). RNNs have loops in them, allowing information to persist. Specifically, information from an RNN is sent back to itself, so that over time the RNN is actually learning from itself. One of the appeals of RNNs is that they may be able to connect previous information to a present task. However, they can have trouble in making predictions based on non-recent information. For example, an RNN trained to predict the meaning of a last word in a long sentence may be able to accurately make that prediction based on the prior few words in the long sentence, but it may not perform well if the key to understanding the last word in the long sentence was the first word in the long sentence. As the gaps between words grows, RNNs become less able to connect the information.

In an example embodiment, an LSTM network is used to avoid this long-term dependency problem. An LTSM has four separate neural network layers interacting in a special way. The first layer is a sigmoid layer that decides which information to discard from the cell state. This layer decides what information to forget, such as forgetting the gender of a subject when a new subject is encountered in a sentence. The second layer is a sigmoid layer that decides which values to save in the cell. The third layer then actually updates the new cell state based on the decisions from the first and second layers. The fourth layer is another sigmoid layer that decides what will be output.

Figure 3:
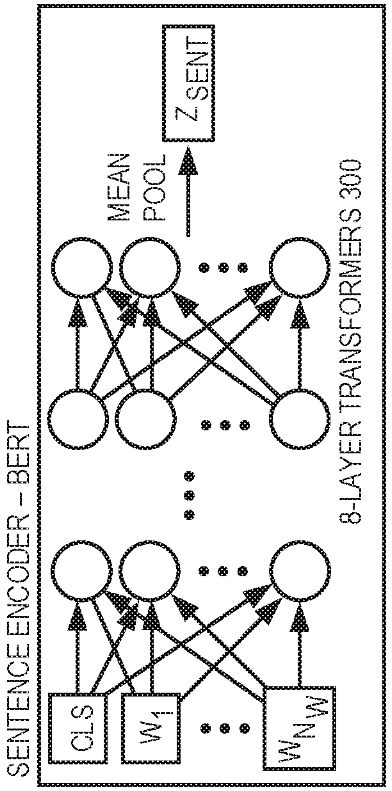
FIG. 3 is a block diagram illustrating Bidirectional Encoder Representations from Transformers (BERT) in accordance with an example embodiment.

In an example embodiment, Bidirectional Encoder Representations from Transformers (BERT) are used to encode sentences into embeddings in the sentence encoder 204. It should be noted that BERT is merely used in some example embodiments, and in others another language model can be used in lieu of BERT. FIG. 3 is a block diagram illustrating BERT in accordance with an example embodiment. BERT uses transformer layer(s) 300 to encode the input sentence to embedding. Each transformer layer is defined as follows:

$$TFLayer(h^{n-1}) = FC(MultiAttn(h^{n-1}));$$

$$FC(x) = relu(xW_1 + b_1)W_2 + b_2;$$

-continued $$MultiAttn(h^{n-1}) = concat(head_1(h^{n-1}), \ldots , head_k(h^{n-1}))W^O,$$

$$head_i(h^{n-1}) = softmax\left(\frac{(h^{n-1}W_q^i)(h^{n-1}W_k^i)}{\sqrt{d_k}}\right)(h^{n-1}W_v^i).$$

where $h^{n-1}$ is the output of the previous transformer layer. Here, a BERT model with 8 transformer layers is used, and the output sentence embedding $z_{sent}$ is defined as the mean-pooling result of the last transformer layer's output. For simplicity, batch normalization and residual connections are omitted in the equations.

Figure 4:
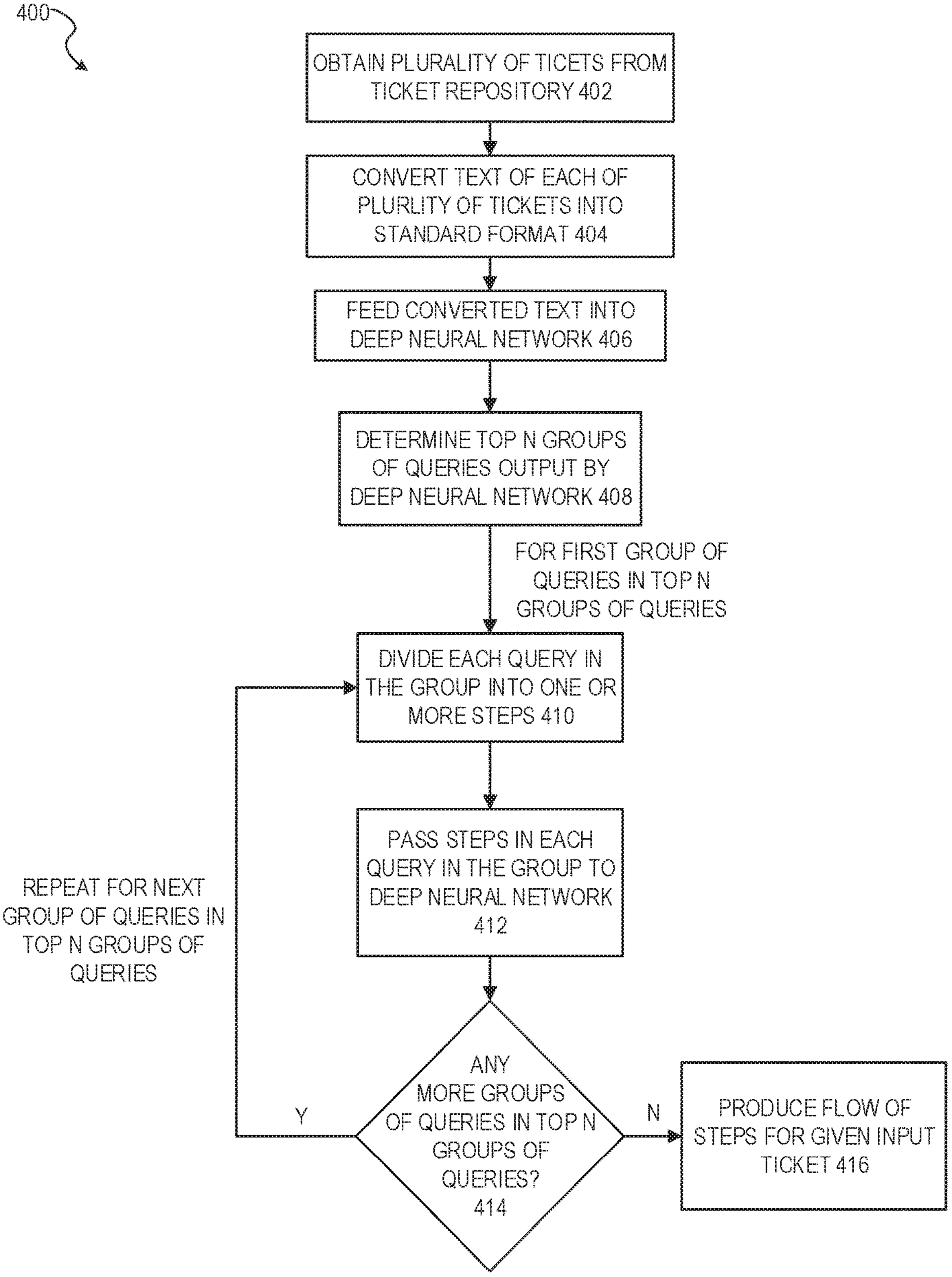
FIG. 4 is a flow diagram illustrating a method of creating a flow from a ticket in accordance with an example embodiment.

FIG. 4 is a flow diagram illustrating a method 400 of creating a flow from a ticket in accordance with an example embodiment. At operation 402, a plurality of tickets is obtained from a ticket repository. Each ticket includes text pertaining to a request, such as text received from a customer about a problem. The text may have been received via phone or via email or similar messaging systems, such as an in-app help channel.

At operation 404, the text of the plurality of tickets is converted into a standard format. In this context, a standard format is simply a single format that is deemed to be acceptable as input to the deep neural network. This conversion may include query language normalization and general filtering. As described above, query language normalization involves modification of the text so that it only includes a specified language or languages. In one example embodiment, normalization may involve removing the text that is not in the specified language(s) from the ticket, while in other example embodiments machine translation techniques may be used to covert the text that is not in the specified language(s) to a specified language.

The general filtering actions may include removing unwanted words and characters from the queries, such as by removing unnecessary punctuation and characters and performing stemming and lemmatization of words using a natural language processor.

At operation 406, the converted text is fed to a deep neural network. The deep neural network is trained to identify one or more queries in the text of each ticket, embed each query into a set of coordinates in a multidimensional space, and group the queries into groupings of semantically similar queries by calculating a similarity score between each pair of queries using a distance metric between the embedded sets of coordinates corresponding to each query in the pair and then grouping queries together that have similarity scores among them that exceed a predetermined threshold.

At operation 408, the top in groups of queries output by the deep neural network are determined, based on the number of queries in each group, with n being a predetermined value. Thus, the n largest groups of queries are identified.

A loop is then begun for each group of queries in the top n groups of queries. At operation 410, each query in the group is divided into one or more steps by comparing the text of each query to a business object dictionary storing business objects available to be acted upon or about in the system and dividing the text such that each step contains a single business object from the business object dictionary. At operation 412, the steps in each query in the group are passed to the deep neural network, thus producing groupings of semantically similar steps.

At operation 414, it is determined if there are any additional groups of queries in the top n groups of queries. If so, then the method 400 loops back to operation 410 for the next group of queries in the top n groups of queries. If not, then at operation 416, for a given input ticket, a flow of steps comprising one or more steps is produced, each step in the flow of steps corresponding to a different grouping of semantically similar steps representing a portion of text in the input ticket.

EXAMPLES

Example 1. A system comprising:

at least one hardware processor; and a non-transitory computer-readable medium storing instructions that, when executed by the at least one hardware processor, cause the at least one hardware processor to perform operations comprising:

obtaining, from a ticket repository, a plurality of tickets, at least one ticket including text pertaining to a request;

converting the text of the plurality of tickets into a standard format;

feeding the converted text to a deep neural network trained to identify one or more queries in the text of a ticket, embed the one or more queries into a set of coordinates in a multidimensional space, and group the queries into groupings of semantically similar queries by calculating a similarity score between pairs of queries using a distance metric between the embedded sets of coordinates corresponding to the queries in the pair and then grouping queries together that have similarity scores among them that exceed a predetermined threshold; and for one or more groups of queries output by the deep neural network:

dividing one or more queries in the group into one or more steps by comparing the text of a query to an object dictionary storing business objects available to be acted upon or about in the system and dividing the text such that each step contains a single object from the object dictionary; and passing the steps in one or more queries in the group to the deep neural network, thus producing groupings of semantically similar steps; and for a given input ticket, producing a flow of steps comprising one or more steps, each step in the flow of steps corresponding to a different grouping of semantically similar steps representing a portion of text in the input ticket.

Example 2. The system of Example 1, wherein the operations further comprise:

identifying the top n groups of queries, wherein n is a predetermined value and the top n groups of queries are selected based on a number of queries in a group of queries; and wherein the dividing and passing are performed only for the top n groups of queries.

Example 3. The system of Examples 1 or 2, wherein the deep neural network includes a sentence encoder pre-trained with general tasks and then fine-tuned with a multilayer perceptron network (MLP).

Example 4. The system of any of Examples 1-3, wherein the converting includes removing any text in a language other than one or more preselected languages.

Example 5. The system of any of Examples 1-4, wherein the converting includes performing stemming and lemmatization.

Example 6. The system of any of Examples 1-5, wherein the dividing includes identifying if two business objects mentioned in the text of the query are joined by one or more predefined conjunctions.

Example 7. The system of any of Examples 1-6, wherein the distance metric is cosine similarity.

Example 8. A method comprising:

obtaining, from a ticket repository, a plurality of tickets, at least one ticket including text pertaining to a request;

converting the text of the plurality of tickets into a standard format;

feeding the converted text to a deep neural network trained to identify one or more queries in the text of a ticket, embed the one or more queries into a set of coordinates in a multidimensional space, and group the queries into groupings of semantically similar queries by calculating a similarity score between pairs of queries using a distance metric between the embedded sets of coordinates corresponding to the queries in the pair and then grouping queries together that have similarity scores among them that exceed a predetermined threshold; and for one or more groups of queries output by the deep neural network:

dividing one or more queries in the group into one or more steps by comparing the text of a query to an object dictionary storing business objects available to be acted upon or about in the system and dividing the text such that each step contains a single object from the object dictionary; and passing the steps in one or more queries in the group to the deep neural network, thus producing groupings of semantically similar steps; and for a given input ticket, producing a flow of steps comprising one or more steps, each step in the flow of steps corresponding to a different grouping of semantically similar steps representing a portion of text in the input ticket.

Example 9. The method of Example 8, further comprising:

identifying the top n groups of queries, wherein n is a predetermined value and the top n groups of queries are selected based on a number of queries in a group of queries; and wherein the dividing and passing are performed only for the top n groups of queries.

Example 10. The method of Examples 8 or 9, wherein the deep neural network includes a sentence encoder pre-trained with general tasks and then fine-tuned with a multilayer perceptron network (MLP).

Example 11. The method of any of Examples 8-10, wherein the converting includes removing any text in a language other than one or more preselected languages.

Example 12. The method of any of Examples 8-11, wherein the converting includes performing stemming and lemmatization.

Example 13. The method of any of Examples 8-12, wherein the dividing includes identifying if two business objects mentioned in the text of the query are joined by one or more predefined conjunctions.

Example 14. The method of any of Examples 8-13, wherein the distance metric is cosine similarity.

Example 15. A non-transitory machine-readable medium storing instructions which, when executed by one or more processors, cause the one or more processors to perform operations comprising:

obtaining, from a ticket repository, a plurality of tickets, at least one ticket including text pertaining to a request;

converting the text of the plurality of tickets into a standard format;

feeding the converted text to a deep neural network trained to identify one or more queries in the text of a ticket, embed the one or more queries into a set of coordinates in a multidimensional space, and group the queries into groupings of semantically similar queries by calculating a similarity score between pairs of queries using a distance metric between the embedded sets of coordinates corresponding to the queries in the pair and then grouping queries together that have similarity scores among them that exceed a predetermined threshold; and for one or more groups of queries output by the deep neural network:

dividing one or more queries in the group into one or more steps by comparing the text of a query to an object dictionary storing business objects available to be acted upon or about in the system and dividing the text such that each step contains a single object from the object dictionary; and passing the steps in one or more queries in the group to the deep neural network, thus producing groupings of semantically similar steps; and for a given input ticket, producing a flow of steps comprising one or more steps, each step in the flow of steps corresponding to a different grouping of semantically similar steps representing a portion of text in the input ticket.

Example 16. The non-transitory machine-readable medium of Example 15, wherein the operations further comprise:

identifying the top n groups of queries, wherein n is a predetermined value and the top n groups of queries are selected based on a number of queries in a group of queries; and wherein the dividing and passing are performed only for the top n groups of queries.

Example 17. The non-transitory machine-readable medium of Examples 15 or 16, wherein the deep neural network includes a sentence encoder pre-trained with general tasks and then fine-tuned with a multilayer perceptron network (MLP).

Example 18. The non-transitory machine-readable medium of any of Examples 15-17, wherein the converting includes removing any text in a language other than one or more preselected languages.

Example 19. The non-transitory machine-readable medium of any of Examples 15-18, wherein the converting includes performing stemming and lemmatization.

Example 20. The non-transitory machine-readable medium of any of Examples 15-19, wherein the dividing includes identifying if two business objects mentioned in the text of the query are joined by one or more predefined conjunctions.

Figure 5:
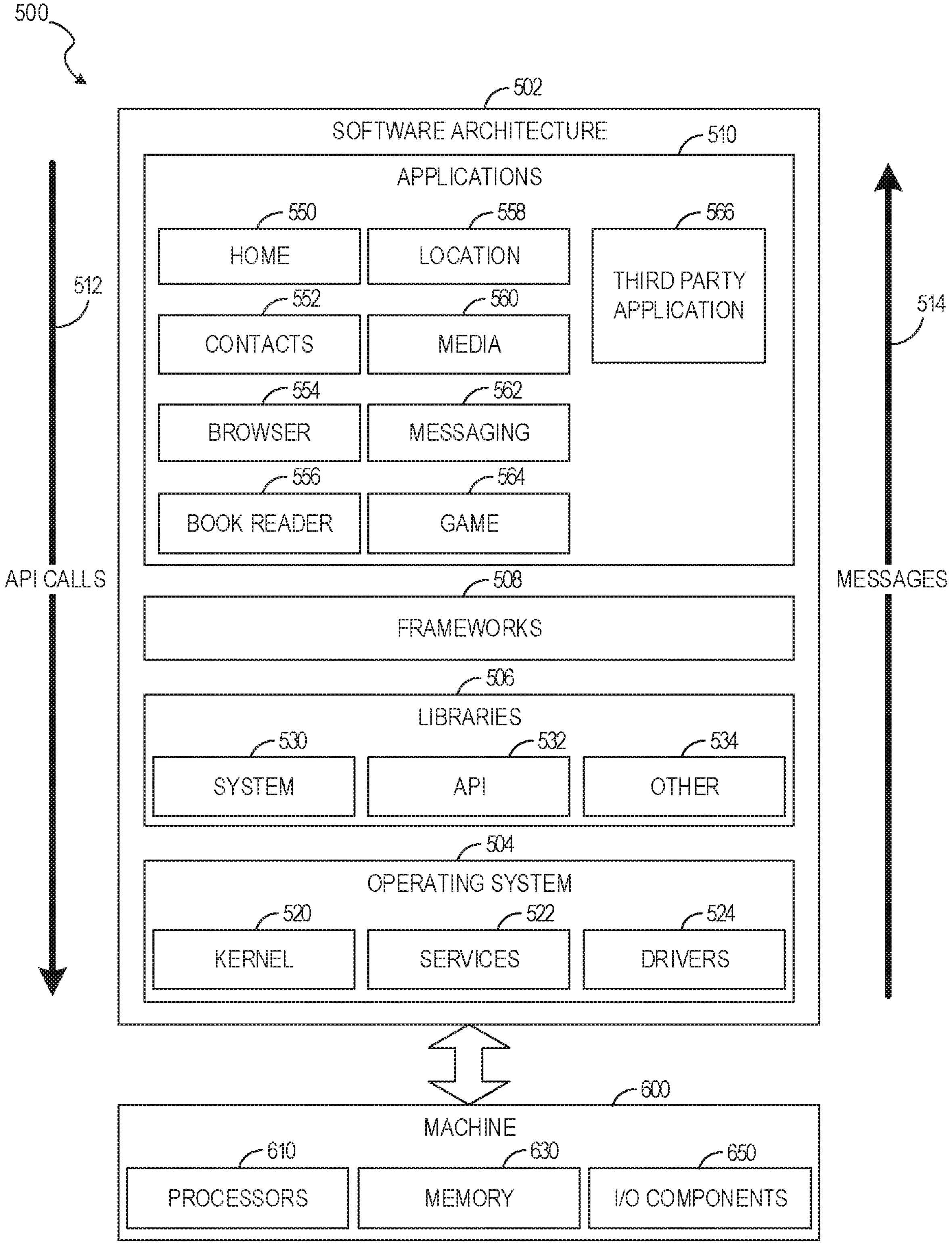
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
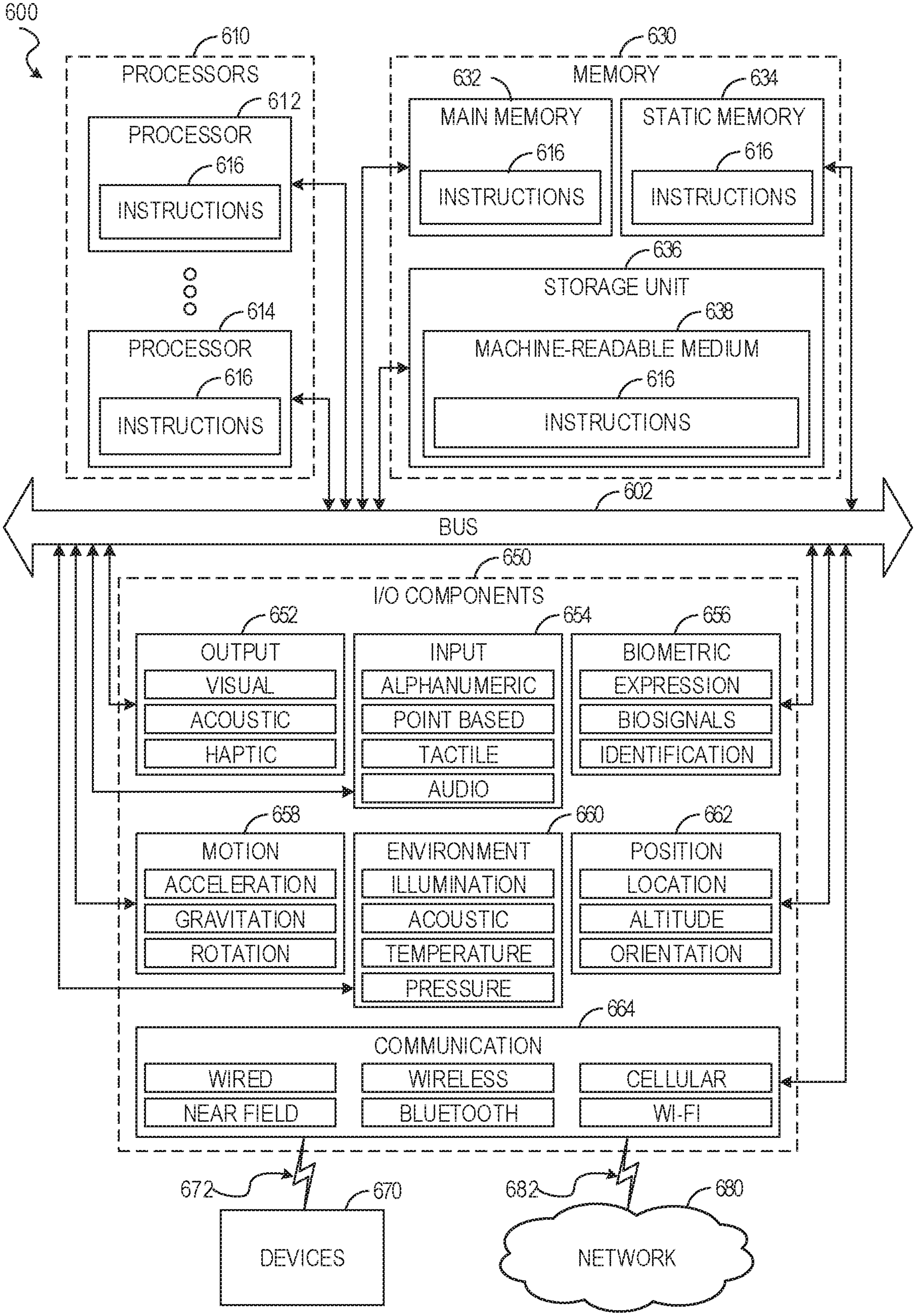
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 on a machine-readable medium 638 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a non-transitory computer-readable medium storing instructions that, when executed by the at least one hardware processor, cause the at least one hardware processor to perform operations comprising:

obtaining, from a ticket repository, a plurality of tickets, at least one ticket including text pertaining to a request;

converting the text of the plurality of tickets into a standard format;

feeding the converted text to a deep neural network trained to detect query language within the converted text of the plurality of tickets and to identify a list of one or more queries in the converted text based on the query language, embed the one or more queries into a set of coordinates in a multidimensional space, and group the queries into groupings of semantically similar queries by calculating a similarity score between pairs of queries using a distance metric between embedded sets of coordinates corresponding to the queries in the pair and then grouping queries together that have similarity scores among them that exceed a predetermined threshold; and for one or more groups of queries output by the deep neural network:

dividing one or more queries in the group into a plurality of steps by comparing the text of a query to an object listing, the object listing being a single data structure containing identifications of objects available to have data structure-related operations performed upon or about in the system, the object listing further containing, for each identification, a corresponding one or more synonyms, and dividing the text such that each step contains a single object from the object listing; and passing the steps in one or more queries in the group to the deep neural network, thus producing groupings of semantically similar steps; and for a given input ticket, producing a flow of steps comprising one or more steps, each step in the flow of steps corresponding to a different grouping of semantically similar steps representing a portion of text in the input ticket.

2. The system of claim 1, wherein the operations further comprise:

identifying top n groups of queries, wherein n is a predetermined value and the top n groups of queries are selected based on a number of queries in a group of queries; and wherein the dividing and passing are performed only for the top n groups of queries.

3. The system of claim 1, wherein the deep neural network includes a sentence encoder pre-trained with general tasks and then fine-tuned with a multilayer perceptron network (MLP).

4. The system of claim 1, wherein the converting includes removing any text in a language other than one or more preselected languages.

5. The system of claim 1, wherein the converting includes performing stemming and lemmatization.

6. The system of claim 1, wherein the dividing includes identifying if two business objects mentioned in the text of the query are joined by one or more predefined conjunctions.

7. The system of claim 1, wherein the distance metric is cosine similarity.

8. A method comprising:

obtaining, from a ticket repository, a plurality of tickets, at least one ticket including text pertaining to a request;

converting the text of the plurality of tickets into a standard format;

feeding the converted text to a deep neural network trained to detect query language within the converted text of the plurality of tickets and to identify a list of one or more queries in the converted text based on the query language, embed the one or more queries into a set of coordinates in a multidimensional space, and group the queries into groupings of semantically similar queries by calculating a similarity score between pairs of queries using a distance metric between embedded sets of coordinates corresponding to the queries in the pair and then grouping queries together that have similarity scores among them that exceed a predetermined threshold; and for one or more groups of queries output by the deep neural network:

dividing one or more queries in the group into a plurality of steps by comparing the text of a query to an object listing, the object listing being a single data structure containing identifications of objects available to have data structure-related operations performed upon or about in a system performing the method, the object listing further containing, for each identification, a corresponding one or more synonyms, and dividing the text such that each step contains a single object from the object listing; and passing the steps in one or more queries in the group to the deep neural network, thus producing groupings of semantically similar steps; and for a given input ticket, producing a flow of steps comprising one or more steps, each step in the flow of steps corresponding to a different grouping of semantically similar steps representing a portion of text in the input ticket.

9. The method of claim 8, further comprising:

identifying top n groups of queries, wherein n is a predetermined value and the top n groups of queries are selected based on a number of queries in a group of queries; and wherein the dividing and passing are performed only for the top n groups of queries.

10. The method of claim 8, wherein the deep neural network includes a sentence encoder pre-trained with general tasks and then fine-tuned with a multilayer perceptron network (MLP).

11. The method of claim 8, wherein the converting includes removing any text in a language other than one or more preselected languages.

12. The method of claim 8, wherein the converting includes performing stemming and lemmatization.

13. The method of claim 8, wherein the dividing includes identifying if two business objects mentioned in the text of the query are joined by one or more predefined conjunctions.

14. The method of claim 8, wherein the distance metric is cosine similarity.

15. A non-transitory machine-readable medium storing instructions which, when executed by one or more processors, cause the one or more processors to perform operations comprising:

obtaining, from a ticket repository, a plurality of tickets, at least one ticket including text pertaining to a request;

converting the text of the plurality of tickets into a standard format;

feeding the converted text to a deep neural network trained to detect query language within the converted text of the plurality of tickets and to identify a list of one or more queries in the converted text based on the query language, embed the one or more queries into a set of coordinates in a multidimensional space, and group the queries into groupings of semantically similar queries by calculating a similarity score between pairs of queries using a distance metric between embedded sets of coordinates corresponding to the queries in the pair and then grouping queries together that have similarity scores among them that exceed a predetermined threshold; and for one or more groups of queries output by the deep neural network:

dividing one or more queries in the group into a plurality of steps by comparing the text of a query to an object listing, the object listing being a single data structure containing identifications of objects available to have data structure-related operations performed upon or about in a system performing the operations, the object listing further containing, for each identification, a corresponding one or more synonyms, and dividing the text such that each step contains a single object from the object listing; and passing the steps in one or more queries in the group to the deep neural network, thus producing groupings of semantically similar steps; and for a given input ticket, producing a flow of steps comprising one or more steps, each step in the flow of steps corresponding to a different grouping of semantically similar steps representing a portion of text in the input ticket.

16. The non-transitory machine-readable medium of claim 15, wherein the operations further comprise:

identifying top n groups of queries, wherein n is a predetermined value and the top n groups of queries are selected based on a number of queries in a group of queries; and wherein the dividing and passing are performed only for the top n groups of queries.

17. The non-transitory machine-readable medium of claim 15, wherein the deep neural network includes a sentence encoder pre-trained with general tasks and then fine-tuned with a multilayer perceptron network (MLP).

18. The non-transitory machine-readable medium of claim 15, wherein the converting includes removing any text in a language other than one or more preselected languages.

19. The non-transitory machine-readable medium of claim 15, wherein the converting includes performing stemming and lemmatization.

20. The non-transitory machine-readable medium of claim 15, wherein the dividing includes identifying if two business objects mentioned in the text of the query are joined by one or more predefined conjunctions.

* * * * *